United States Patent [19]
Syler et al.

[11] Patent Number: 5,568,687
[45] Date of Patent: Oct. 29, 1996

[54] METHOD OF FABRICATING A TANK AND METHOD OF FABRICATING A TANK CONNECTOR THEREFOR

[75] Inventors: Rodeny R. Syler, Franklin; Rolf E. Faber, Clarksville; D. Kent Lindahl, Pleasant View, all of Tenn.

[73] Assignee: State Industries, Inc., Ashland City, Tenn.

[21] Appl. No.: 322,625

[22] Filed: Oct. 13, 1994

[51] Int. Cl.$^6$ ..................................................... B23P 15/00
[52] U.S. Cl. ........................................... 29/890.14; 29/456
[58] Field of Search .................................. 29/456, 527.1, 29/890.14; 220/465, 256, 289, 661; 264/310

[56] References Cited

U.S. PATENT DOCUMENTS

| | | | |
|---|---|---|---|
| Re. 27,496 | 4/1973 | Metcalf | 29/456 |
| 4,712,711 | 12/1987 | Gerry et al. | 29/456 |
| 5,158,200 | 10/1992 | Vago et al. | 220/465 |
| 5,217,140 | 6/1993 | Lindahl | 220/453 |

*Primary Examiner*—Irene Cuda
*Attorney, Agent, or Firm*—Paul R. Puerner

[57] ABSTRACT

A method of making a tank includes the steps of forming a pair of top and bottom half members by deep drawing, welding at least one tank connector assembly in an opening in one of the half members and fastening the top and bottom half members together by welding to form an outer shell having an internal surface. The outer shell is changed with non-corrosive polymer material before or after the welding step. The tank is subjected to a rotational movement in the presence of heat to thus cause the polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein the mold becomes a permanent part of the completed tank. The tank connector assembly is fabricated by first providing a metal connector member having a tubular wall and a welding projection on one end thereof, inserting an insert member of non-metallic, non-corrosive material in one end of the metal connector member. Forming a connector sleeve inside the assembly of the metal connector member and insert member by injection molding. The connector sleeve member has an internally threaded tubular wall portion and is made of a polymer material having "low creep" characteristics.

16 Claims, 7 Drawing Sheets

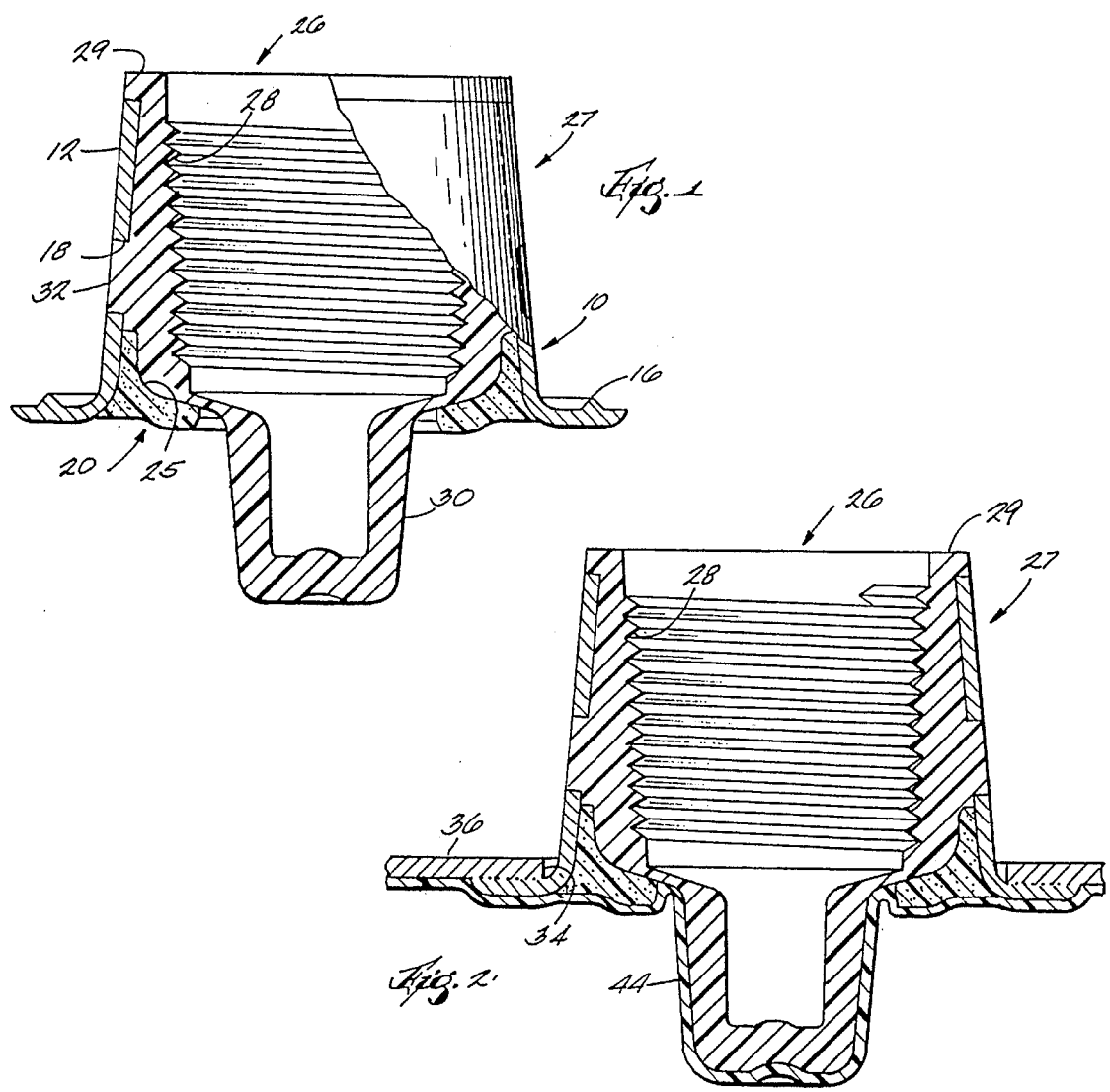
Fig. 1
Fig. 2
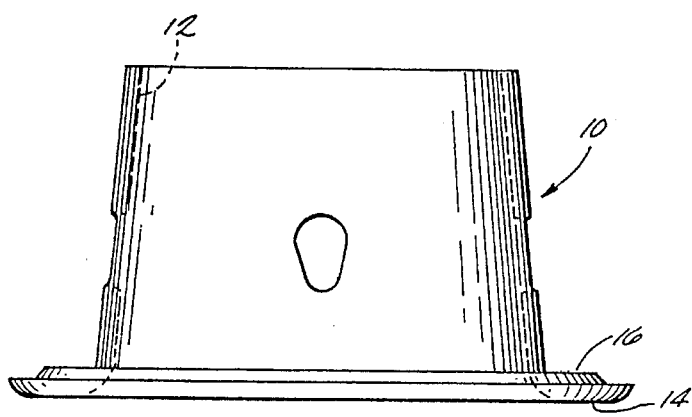
Fig. 3

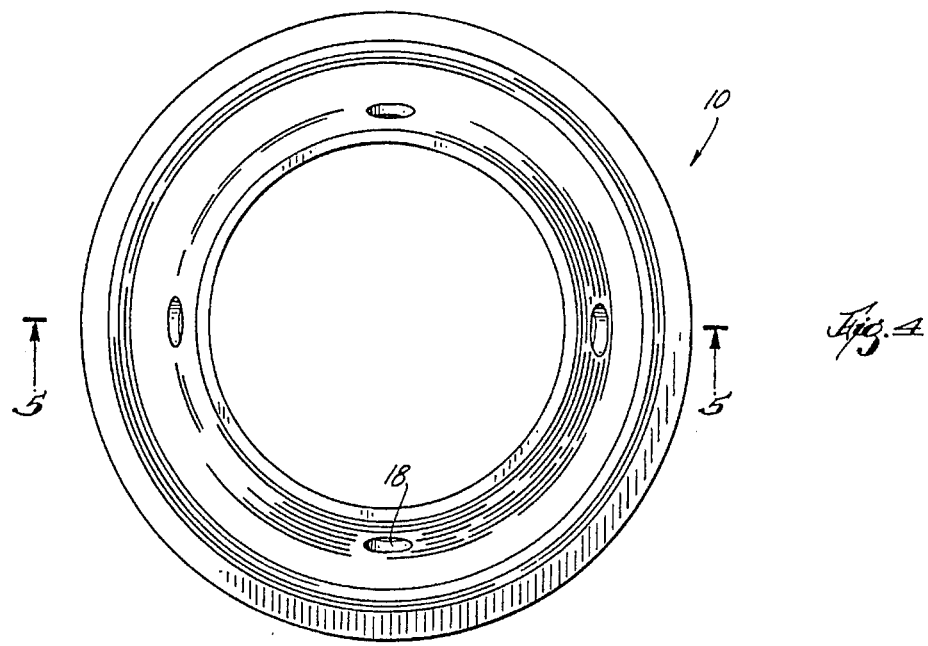
Fig. 4
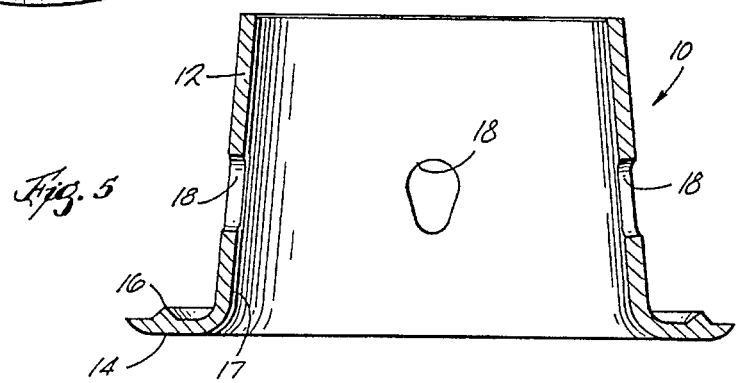
Fig. 5
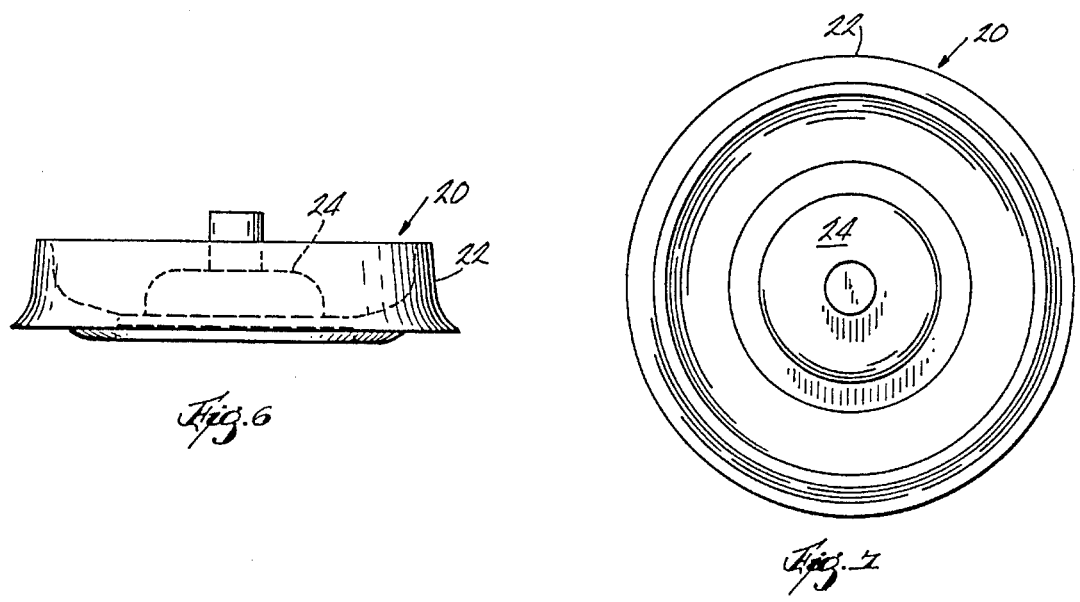
Fig. 6
Fig. 7

5,568,687

METHOD OF FABRICATING A TANK AND METHOD OF FABRICATING A TANK CONNECTOR THEREFOR

RELATED APPLICATION

An application directed to the product made by the method of the present application is identified by Ser. No. 08/322,236 filed on Oct. 13, 1994 which related application being assigned to the assignee of the present application.

BACKGROUND OF THE INVENTION

The background of the invention is set forth hereafter under the heading "Description of the Prior Art".

SUMMARY OF THE INVENTION

A method of making a tank comprising the steps of forming a pair of top and bottom half members by deep drawing, welding at least one tank connector assembly in an opening in one of the half members, fastening the top and bottom half members together by welding to form an outer shell having an internal surface. Charging the outer shell with non-corrosive polymer material before or after the welding step. Subjecting the tank to a rotational movement in the presence of heat to thus cause the polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank. The tank connector assembly is fabricating by first providing a metal connector member having a tubular wall and a welding projection means on one end thereof, inserting an insert member of non-metallic, non-corrosive material in one end of the metal connector member. Forming a connector sleeve inside the assembly of the metal connector member and insert member by injection molding. The connector sleeve member has an internally threaded tubular wall portion and is made of a polymer material having "low creep" characteristics.

BRIEF DESCRIPTION OF THE DRAWINGS

FIG. 1 is a sectional view of a tank connector construction before the inner shell of non-corrosive and non-metallic material is formed in the outer shell;

FIG. 2 is a sectional view like that shown in FIG. 1 but with the inner shell formed in the outer shell;

FIG. 3 is a side elevation view of the metal connector fitting;

FIG. 4 is a top plan view of the fitting shown in FIG. 3;

FIG. 5 is a sectional view taken along line 5—5 of FIG. 4;

FIG. 6 is a side elevation view of a polymer insert member;

FIG. 7 is a bottom plan view of the member shown in FIG. 6;

DESCRIPTION OF THE PREFERRED EMBODIMENT

Figure 8:
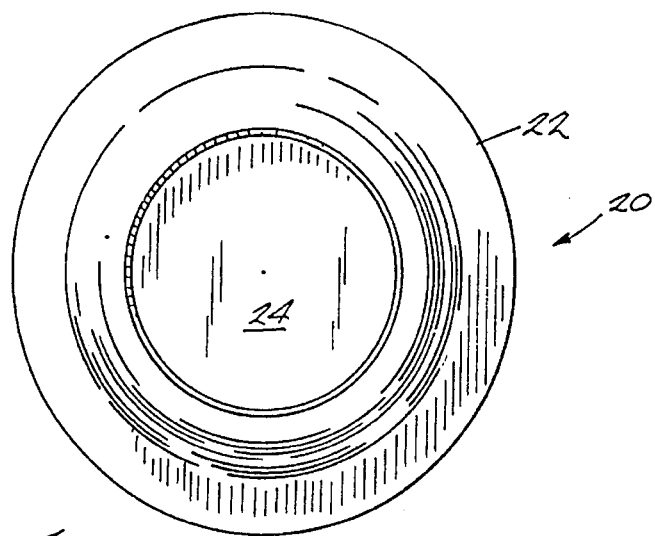
FIG. 8 is a top plan view of the member shown in FIG. 6.
Figure 9:
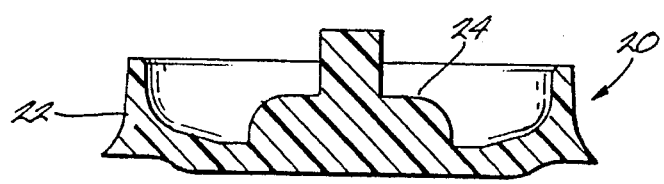
FIG. 9 is a sectional view taken along line 9—9 of FIG. 8.

As previously indicated, the tank connector fitting construction of the present invention is specifically designed for use in a tank comprised of an outer shell of metal material and an inner shell of non-corrosive and non-metallic polymer material. More specifically, the preferred embodiment of the present invention is designed for installation in a tank construction shown and described in U.S. Pat. No. 5,217,140 issued Jun. 8, 1993 and assigned to the assignee of this application and incorporated herein by reference.

DESCRIPTION OF THE PRIOR ART

Prior tank connector fittings tot use in the tank construction shown in U.S. Pat. No. 5,217,140 are shown and described in U.S. Pat. No. 5,158,200 dated Oct. 27, 1992 and assigned to the assignee of this application. An example of such a prior art tank connector construction is as follows.

Referring to FIGS. 131–134, FIG. 131 shows a tank connection comprised of an outer tank shell 370 of metal and a metal connector fitting 372 welded to shell 370 at weld areas 374. Fitting 372 has an internal threaded body portion 376 and an internal groove 378. A sleeve 380 having a cylindrical body portion 382 and a radially extending flange portion 384 is mounted in groove 378 of fitting 372. Body portion 382 and flange 384 have a continuous smooth tapered internal surface 385. Sleeve 380 is made of a polymer material. The body portion 382 of sleeve 380 extends through an opening 386 in shell 370.

Figure 131:
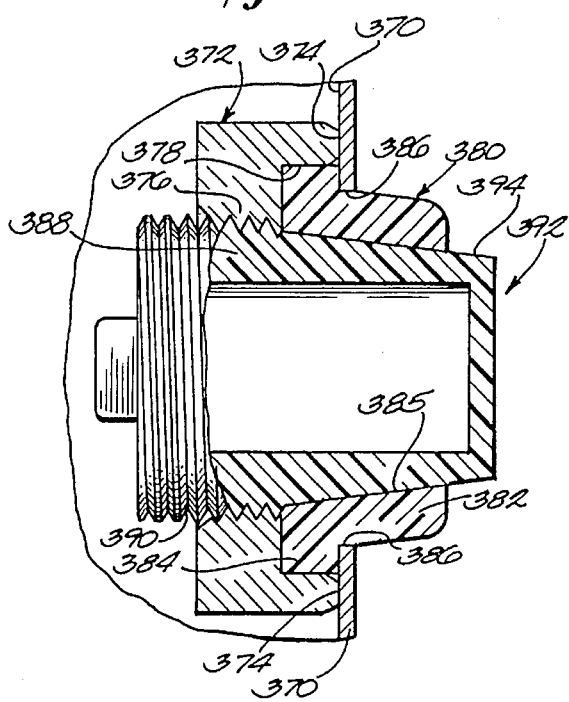
FIGS. 131—134 show a prior art tank connector reproduced from U.S. Pat. No. 5,158,200.

A plug member 388 is threaded into fitting 372 and extends through sleeve 380 as shown in FIG. 131. Plug member 388 is preferably made of a material having a low thermal conductivity such as Teflon. Plug member 388 is comprised of an externally threaded body portion 390 and an end portion 392 having a smooth external tapered surface 394. With the plug 388 installed as shown in FIG. 131, the threaded portion 390 extends only to the groove 378 in fitting 372 and the tapered surface 394 on the plug fits snugly in the tapered internal surface 385 of sleeve 380.

Figure 132:
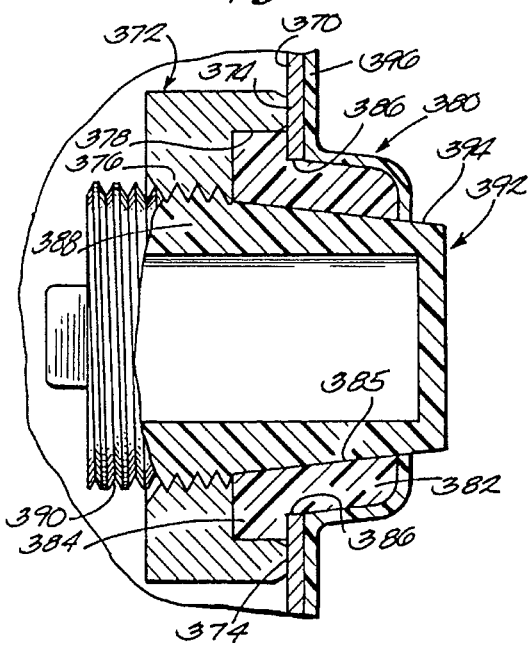

FIG. 132 shows the assembly of FIG. 131 after an inner shell 396 has been formed in the metal outer shell 370. Inner shell 396 is preferably made of a polymer material and is formed by a rotational casting procedure. The inner shell 396 will become fused to the exposed surface of sleeve 380.

Figure 133:
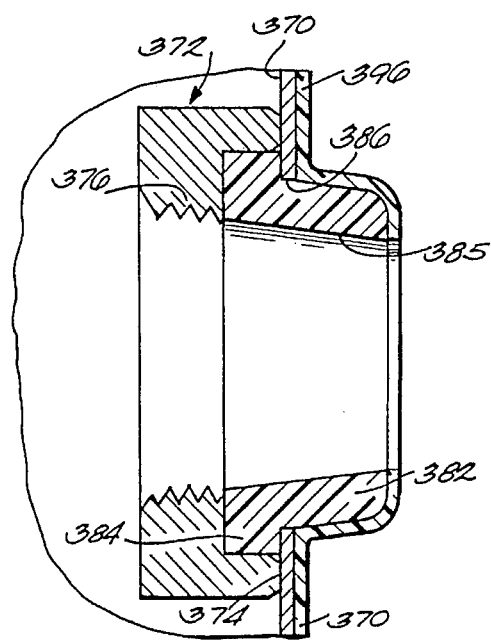
Figure 134:
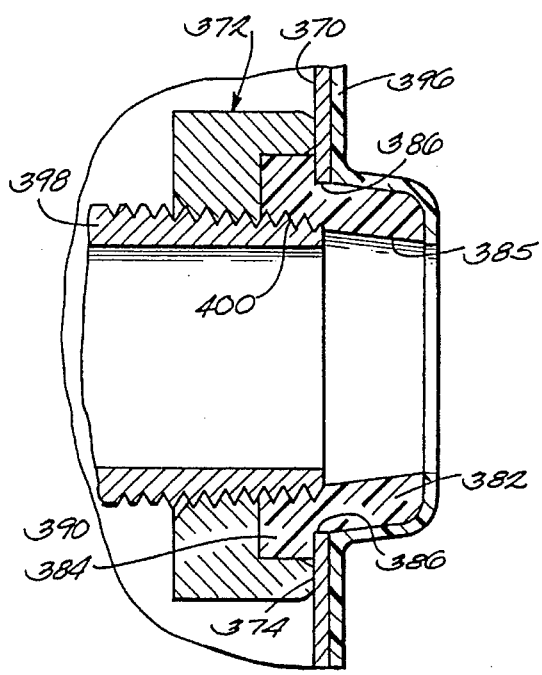

FIG. 134 shows the assembly of FIG. 133 with a threaded pipe nipple 398 installed in fitting 372. In a water heater tank, the threaded nipple 398 may be a part of a temperature and pressure relief valve or a part of a drain valve. It will be appreciated that as a threaded pipe nipple 398 is threaded into fitting 372, the lead threads 400 thereon will cut into the polymer material of tapered surface 385 of sleeve 380 to thereby cut a length of threads into surface 385 as shown in FIG. 134.

The present invention constitutes an improvement to the tank connection shown in FIGS. 131–134.

DESCRIPTION OF THE PREFERRED EMBODIMENT

As explained hereinafter, an object of the present invention is to eliminate or at least reduce the likelihood of water leakage into contact with metal parts of the connector and/or the metal outer tank shell.

One embodiment of the present invention is described as follows. The description will be made in the form of an explanation of the method of fabrication of the tank connector and the tank in which the connector is mounted.

FIGS. 3, 4 and 5 show a metal connector member or spud 10 (preferably of steel). Member 10 has a tubular wall portion 12, a welding projection means 14 with welding projection ring 16 formed thereon. The metal connector member 10 has a bottom opening 17 and the wall portion 12 has a plurality of openings 18, the function of which will be described hereinafter.

FIGS. 6, 7, 8, and 9 show an insert member 20 made from a polymer material. The insert member has a peripheral flange portion 22 and a central portion 24.

A preferred polymer material is maleated polyethylene which is polyethylene which has been chemically compounded with maleic anhydride. The maleation creates sites on the polyethylene chain which are active and will couple with adjacent polar materials. The maleation need only be present in fractional percentages to achieve bonding. Examples of polar materials are: Steel, aluminum, phosphated metals, and amides like nylons. Amodel is also an amide.

Insert member 20 is installed into the bottom opening 17 of metal connector member 10. This can be accomplished by simply forcing insert member 20 into opening 17. Alternatively, the metal connector 10 can be heated before insert member 20 is installed therein. Another alternative is to place metal connector 10 in a heated mold after which member 20 is injection molded into bottom opening 17 of connector 10. Heating metal connector member 10 before injection molding of member 20 into connector 10 will cause member 20 to bond to the connector 10.

The next step is to remove central portion 24 of insert member 20. This is accomplished by a suitable cutting tool (not shown).

The next step is to produce a completed connector assembly as shown in FIG. 1. Preferably the FIG. 1 assembly is made by an injection molding procedure. The completed assembly of FIG. 1 is comprised of a metal connector member 10, an insert member 20 and a threaded connector member 26. The entire assembly is identified by reference numeral 27.

As indicated, the connector assembly 27 is made by an injection molding procedure. The assembly comprised of fitting 10 and insert 20 is positioned in a suitable mold and then the connector member 26 is formed therein by injection molding to form assembly 27.

Connector member 26 has an internally threaded tubular wall portion 28 and a depending nose portion 30 formed integrally with wall 28. During the injection molding procedure, projections 32 on wall 28 will be molded into openings 18 to thereby securely lock member 26 in member 10. The inwardly tapered wall 12 of connector 10 and the over-molded cap portion 29 of connector 26 further serve to securely anchor the connector 26 in member 10.

Member 26 is made of a polymer material having low creep characteristics. Creep is a tendency of plastics to relax away from pressure and form into another dimension where there is less pressure.

A suitable low creep polymer material is polyamide. Examples of a suitable low creep polyamide material are amides like nylon and amodel. More specifically, in one preferred embodiment, the low creep material is polyphthalamide 33% glass filled. It will be appreciated that by making connector member 26 of a low creep material as described above, any tendency of leakage to occur past threads 28 will be substantially reduced if not eliminated.

In processing, amide groups in molten polyamide readily combine with maleated polyethylene as the melt front (about 600° F.) passes over polyethylene re-melting its surface. The resultant composite has the strength of amodel and a water tight seal to polyethylene, i.e., a water tight seal between the mating surface 25 of members 20 and 26. This bond between the two materials is a covalent bond. However, the integrity of the bond is only as good as the integrity of the substrate materials. These must be maintained by correct antioxidants in each polymer. The maleated polyethylene of insert 20 extends into the tank and is available for the inner tank material 44 to melt and bond to it as described hereinafter.

The next step in the fabrication method is to securely fasten the assembly 27 in the steel wall of a tank. This is accomplished by positioning the assembly 27 in an opening 34 in the wall 36 of a tank and then welding the projection 16 on flange 14 to the inner surface of the tank wall as shown in FIG. 2. The welding step will cause welding projection ring 16 to be fused to tank wall 36.

After the required number of assemblies have been welded to the tank wall, the fabrication of the completed tank is accomplished as described as follows.

To summarize, as shown in FIGS. 2, 3, 4, 5 and 6 of U.S. Pat. No. 5,217,140 (corresponding to FIGS. 15, 16, 17, 18 and 19 herein), the outer shell 26a of the completed tank 28a is comprised of two parts; namely, an upper half member 30a and a lower half member 32a, each of which is formed by a deep drawing process.

After the required number of connector assemblies 27 are welded to the tank half members, the half members are fastened together in a secure manner to form a completed outer shell.

Preferably such fastening step is performed by laser welding.

After the completed outer shell is fabricated, an inner shell 44 of non-corrosive polymer material is formed inside the outer shell adjacent the internal surface of the outer shell. In one preferred embodiment, the non-corrosive polymer material is polybutelene. The polybutelene material is introduced into the outer shell in powder form. This can be accomplished before the two halves are welded together or the powder material can be introduced through an opening in the tank wall after the two halves are welded together.

After the outer shell is charged with a polymer material, it is then subjected to rotational casting operation while heat is applied to the outer shell. A suitable rotational casting operation is described in detail in U.S. Pat. No. 5,217,140. Such a rotational casting operation will cause the powder material to melt and be distributed uniformly over the internal surface of the outer shell to thereby form an inner shell 44.

Referring back to FIG. 2 of the present invention, the material of the inner shell will cover the tank wall and each connector fitting as shown in FIG. 2. The portion of the inner shell 44 which comes in contact with insert member 20 will be bonded to such member.

After the formation of the inner shell 44, the nose members 30 on the connector fittings 27 will be removed by a suitable cutting tool.

Figure 14:
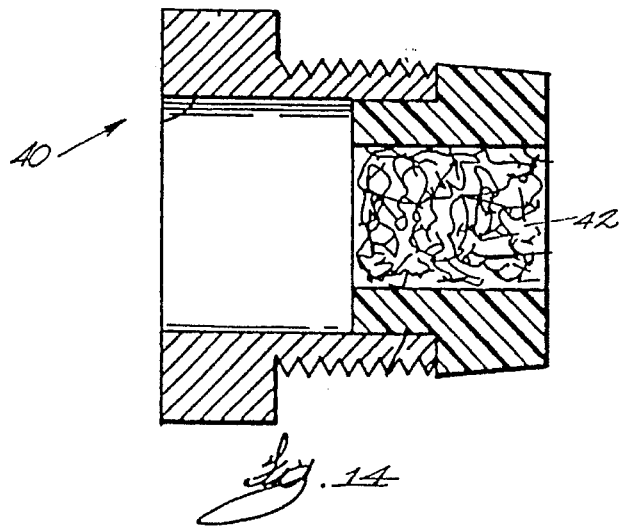
FIG. 14 is a sectional view of a plug member used in the fabrication of a tank.
Figures 15, 16, 17:
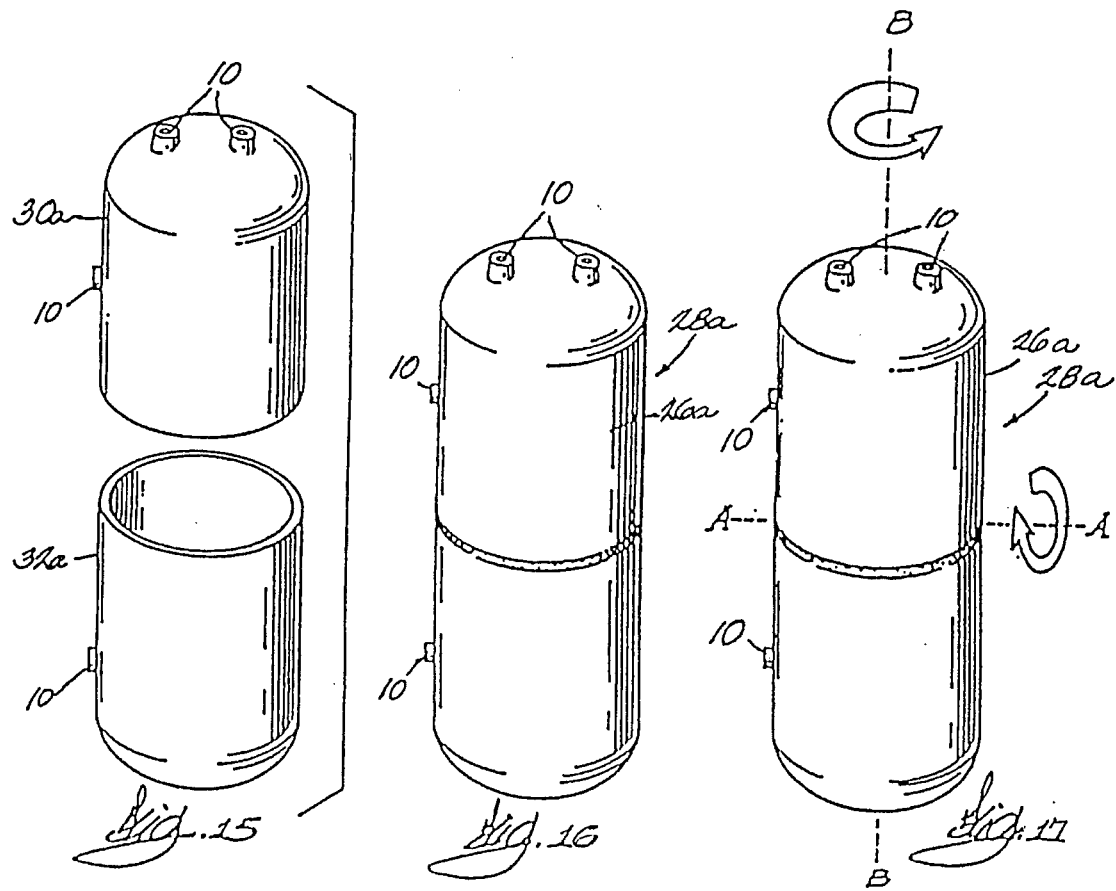
FIGS. 15, 16, 17, 18 and 19 correspond to FIGS. 2, 3, 4, 5, and 6 in U.S. Pat. No. 5,217,140.
Figure 19:
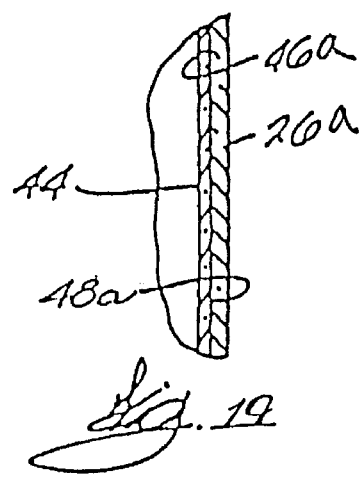
Figure 18:
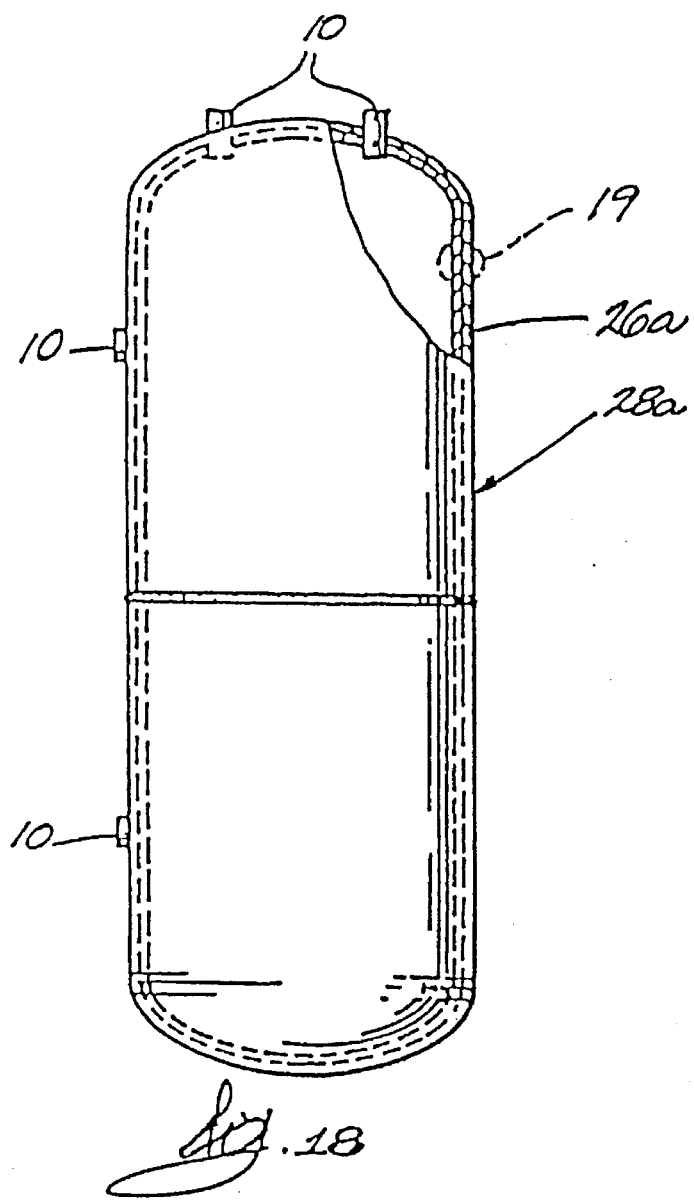

Before the rotational casting step, one of the nose members 30 in one of the connector assemblies 27 will be removed and a plug 40 (as shown in FIG. 14) will be installed in the fitting. The plug has a central opening in which a porous material 42 such as fiber glass is mounted. The porous material will allow air to escape through the plug, but will not allow the polymer material to pass through the plug. This arrangement provides a venting function for the tank during the rotational casting procedure.

Figure 10:
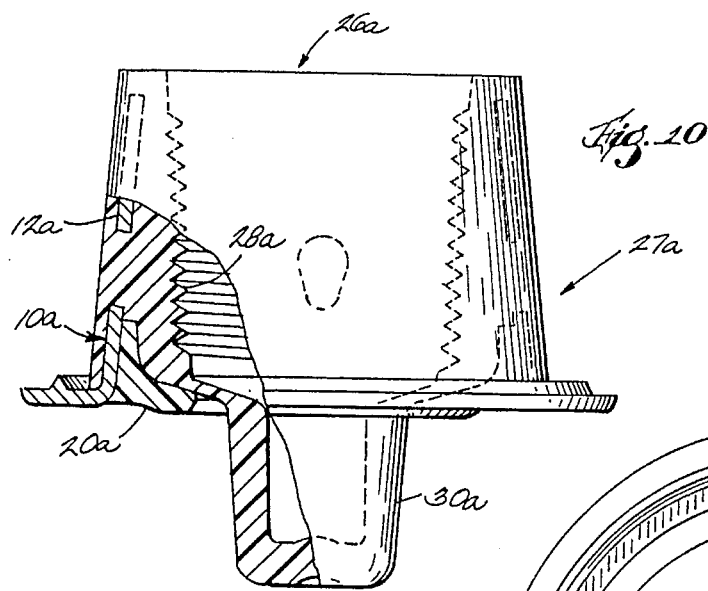
FIG. 10 is a side elevation view of a non-metallic threaded connector member.
Figure 11:
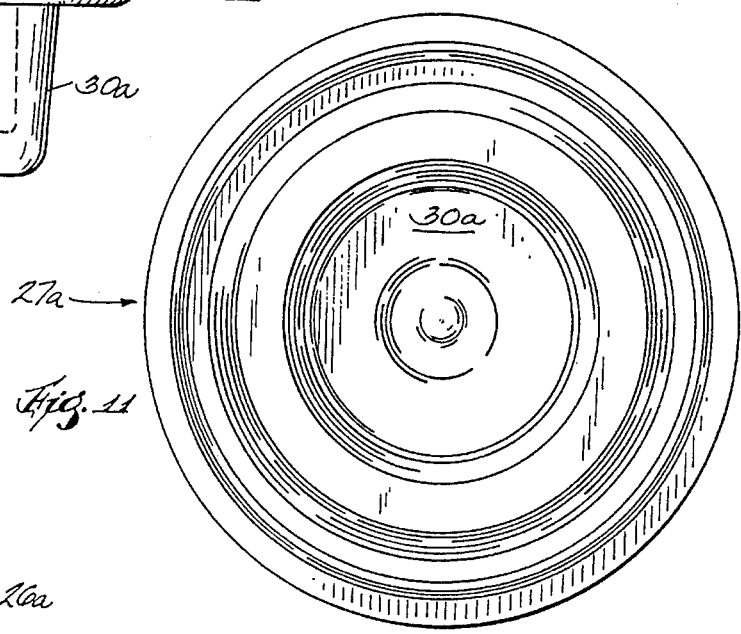
FIG. 11 is a top plan view of the member shown in FIG. 10.
Figure 12:
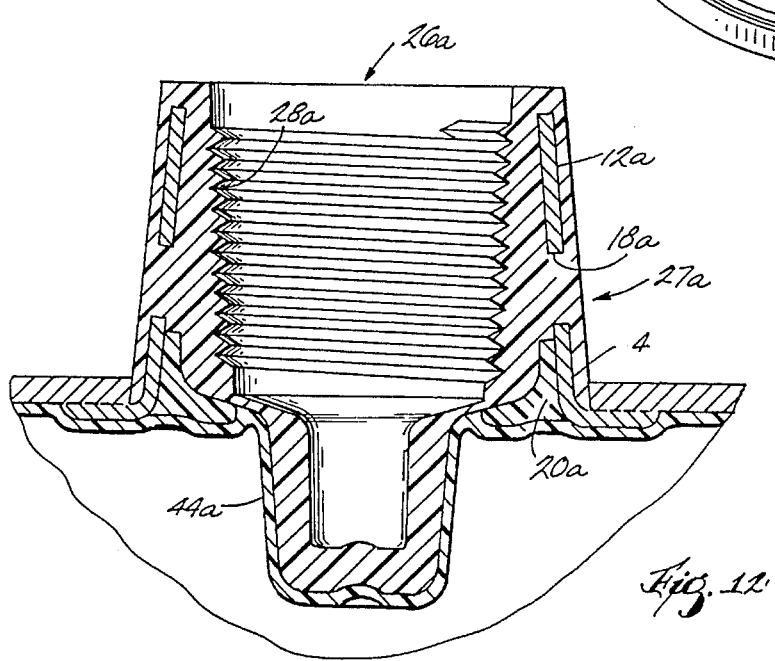
FIG. 12 is a sectional view taken along line 12—12 of FIG. 11.

FIGS. 10, 11 and 12 show a second embodiment of a connector assembly identified by reference numeral 27a.

Assembly 27a is similar to assembly 27 (FIGS. 1 and 2) and the corresponding parts have corresponding reference numerals with an added suffix designation a. The principal difference between connector 27 and connector 27a is the configuration of the threaded connector member 26a. In the injection molding step of this embodiment, connector member 26a is "over-molded" so that it extends through openings 18a and covers the outer surface of wall 12a of metal connector 10a. This "over-molded" configuration adds strength to the assembly 27a and further provides an extended path indicated by reference numeral Y through which water must leak to reach the metal outer shell 36 of the tank. The FIGS. 1 and 2 type connector and the FIGS. 10, 11 and 12 type connector can be used for tank connections such as hot and cold water connections, drainage valves and temperature/pressure relief valves, all of which are used in water heaters.

Figure 13:
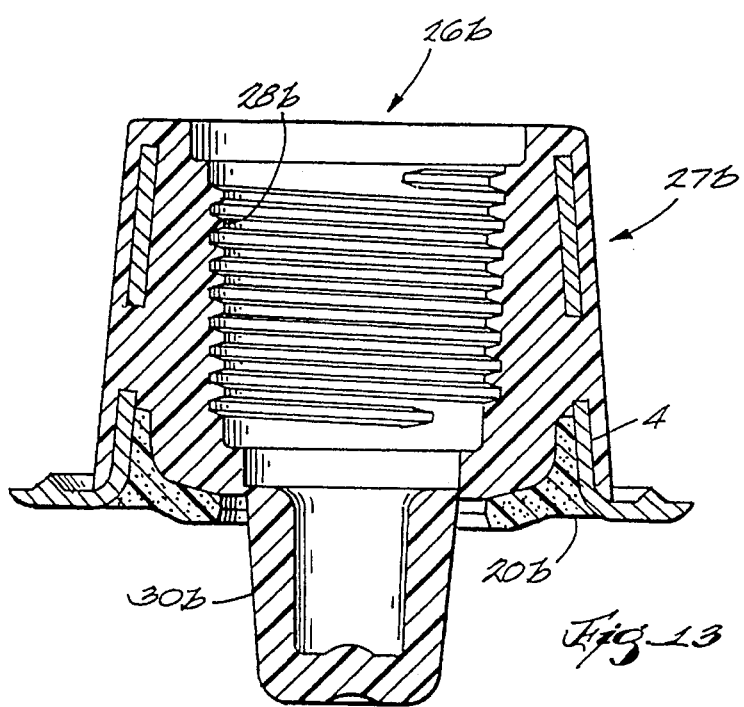
FIG. 13 is a sectional view of a tank connector construction similar to FIG. 2 which represents a second embodiment of the present invention.

FIG. 13 shows another connector assembly embodiment identified by reference numeral 27b. Assembly 27b is similar to the assembly 27a as shown in FIG. 12. The corresponding parts of the two assemblies have corresponding reference numerals with an added suffix designation b for the FIG. 13 embodiment. The principal difference between the FIG. 13 and the FIG. 12 embodiment is the configuration of threads 28b in FIG. 13. The threads 28a of FIG. 12 are V-shaped whereas the threads 28b of assembly 27b (FIG. 13) have a square configuration.

While the invention has been herein shown and described in what is presently conceived to be the most practical and preferred embodiment, it will be obvious to one or ordinary skill in the art that modifications may be made thereof within the scope of the invention, which scope is not to be limited except by the appended claims.

We claim:

1. A method of fabricating a tank and a tank connector therefor comprising the steps of:

(i) forming a pair of top and bottom half members by deep drawing;

(ii) fastening at least one tank connector assembly in an opening in one of said half members by welding, said tank connector assembly fabricated by the following steps:

(a) proving a metal connector member (10) having a tubular wall and a welding projection means at one end thereof;

(b) positioning an insert member (20) of non-metallic, non-corrosive material in said one end of said metal connector member;

(c) forming a connector sleeve (26) inside the assembly of parts described in steps (a) and (b) by injection molding, said connector sleeve member having an internally threaded tubular wall portion, said connector sleeve member being made of a polymer material having "low creep" characteristics;

(iii) fastening the top and bottom half members together by welding to form an outer shell having an internal surface;

(iv) charging one half member of the outer shell with a non-corrosive polymer material before said welding step;

(v) subjecting the tank to a rotational movement in the presence of heat to thus cause the polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

2. A method of fabricating a tank and a tank connector therefor according to claim 1 wherein the welding projection means specified in the metal connector member set forth in step (a) is welded to one of said half members.

3. A method of fabricating a tank and a tank connector therefor according to claim 1 wherein the insert member specified in step (b) becomes fused to the inner shell specified in step (v).

4. A method of fabricating a tank and tank connector therefor according to claim 1 in which the polymer material of said connector sleeve member (26) is polyamide.

5. A method of fabricating a tank and a tank connector therefor comprising the steps of:

(i) forming a pair of top and bottom half members by deep drawing;

(ii) fastening at least one tank connector assembly in an opening in one of said half members by welding, said tank connector assembly fabricated by the following steps:

(a) proving a metal connector member (10) having a tubular wall and a welding projection means at one end thereof;

(b) positioning an insert member (20) of non-metallic, non-corrosive material in said one end of said metal connector member;

(c) forming a connector sleeve (26) inside the assembly of parts described in steps (a) and (b) by injection molding, said connector sleeve member having an internally threaded tubular wall portion, said connector sleeve member being made of a polymer material having "low creep" characteristics;

(iii) fastening the top and bottom half members together by welding to form an outer shell having an internal surface;

(iv) charging the outer shell with a non-corrosive polymer material after said welding step;

(v) subjecting the tank to a rotational movement in the presence of heat to thus cause the polymer material to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

6. A method of fabricating a tank and a tank connector therefor according to claim 5 wherein the welding projection means specified in the metal connector member set forth in step (a) is welded to one of said half members.

7. A method of fabricating a tank and a tank connector therefor according to claim 5 wherein the insert member specified in step (b) becomes fused to the inner shell specified in step (v).

8. A method of fabricating a tank and tank connector therefor according to claim 5 in which the polymer material of said connector sleeve member (26) is polyamide.

9. The method of fabricating a tank connector assembly for mounting in a tank having an outer shell of metal material and an inner shell of non-corrosive, non-metallic material mounted inside said outer shell comprising the following steps:
   a. providing a metal connector member (10) having a tubular wall and a welding projection means at one end thereof adapted for welding to the tank outer shell;
   b. positioning an insert member (20) of non-metallic, non-corrosive material in said one end of said metal connector member;
   c. forming a connector sleeve (27) inside the assembly of parts described in steps (a) and (b), said connector sleeve member having an internally threaded tubular wall portion, said connector sleeve member being made from a polymer material having "low creep" characteristics.

10. The method of fabricating a tank connector assembly for mounting in a tank according to claim 9 in which the part described in step (a) is heated before the part described in step (b) is inserted therein.

11. The method of fabricating a tank connector assembly for mounting in a tank according to claim 9 in which connector sleeve (27) is injection molded into the assembly of the parts described in steps (a) and (b).

12. The method of fabricating a tank connector assembly for mounting in a tank according to claim 11 in which the material of said connector sleeve member is polyamide material.

13. The method of fabricating a tank connector assembly for mounting in a tank according to claim 12 in which the polyamide material of said connector sleeve is a model.

14. The method of fabricating a tank connector assembly for mounting in a tank according to claim 12 in which the polyamide material of said connector sleeve member is nylon.

15. The method of fabricating a tank connector assembly for mounting in a tank according to claim 9 in which the material of said connector sleeve member is polyphthalamide 33% glass filled.

16. The method of fabricating a tank connector assembly for mounting in a tank according to claim 9 in which the material of said insert member is maleated polyethylene.

* * * * *